United States Patent [19]
Kinoshita

[11] Patent Number: 5,283,972
[45] Date of Patent: Feb. 8, 1994

[54] OTTER BOARD

[75] Inventor: Hiromi Kinoshita, Shimonoseki, Japan

[73] Assignee: Nichimo Co., Ltd., Tokyo, Japan

[21] Appl. No.: 791,916

[22] Filed: Nov. 13, 1991

[30] Foreign Application Priority Data

Dec. 6, 1990 [JP] Japan .................. 2-400151[U]

[51] Int. Cl.$^5$ ............................................. A01K 73/045
[52] U.S. Cl. ........................................ 43/9.7; 43/43.13
[58] Field of Search ............................. 43/9.7, 43.13

[56] References Cited

U.S. PATENT DOCUMENTS

| | | | |
|---|---|---|---|
| 3,281,980 | 11/1966 | Luketa | 43/9.7 |
| 4,180,935 | 1/1980 | Goudey | 43/9.7 |
| 4,879,830 | 11/1989 | Quick | 43/9.7 |

FOREIGN PATENT DOCUMENTS 0507285 4/1976 U.S.S.R. .................. 43/43.13

*Primary Examiner*—Richard K. Seidel
*Assistant Examiner*—Kenneth J. Hansen

[57] ABSTRACT

A towable Otter Board having upstream facing flap portions is disclosed for use in trawl fishing applications. The flap portions are used to divert fluid flow from the concave lower board surface to the upper convex board surface which serves to shift a vortex formed proximate the upper board surface further downstream to a position closer to the trailing edge of the board which provides considerable improvement over the prior art by decreasing drag and increasing lift. A single wing and bi-plane version of the board is disclosed.

20 Claims, 4 Drawing Sheets

OTTER BOARD

TECHNICAL FIELD

The present invention relates to the otter board used in trawl fishing.

BACKGROUND OF THE INVENTION

In general, the otter board used in trawl fishing having as large as possible value of L/D, i.e. having a large net-mouth expanding force (L) and/or a small drag (D) is desirable. When these requisites are satisfied, the drag of otter board is decreased, which enables tugging of large trawl net and using of the otter board having smaller surface area with easier handling and lower costs.

In developing the heretofore known otter boards, a number of attempts have been carried out for making the value L/D as large as possible.

For example, a slit type of otter board is suggested which has a plurality of longitudinal slits 2, 2 . . . in the concave inner surface thereof as shown in FIG. 5, or a multi-wing type of otter board is proposed which comprises several wings 4, 4 . . . having each a large ratio of longitudinal and lateral sizes.

The first type of otter board having slits 2 therein has an substantially decreased surface area thereof, so that the drag D thereof is decreased but its net-mouth expanding force (L) is also decreased, while the second multi-wing type of otter board has an increased net-mouth expanding force (L) but its drag (D) is also increased.

SUMMARY OF THE INVENTION

Consequently, it has been impossible to obtain any otter board having a larger L/D, e. a larger net-mouth expanding force (L) and smaller drag (D).

It is therefore the object of this invention to deliver an otter board having a larger net-mouth expanding force (L) as well as a smaller drag (D), consequently a larger efficiency (L/D).

For achieving the above object, this invention comprises an otter board having at least one wing body with a concave inner surface, at least One Of said wing bodies is provided with a through-hole or through-holes connecting the outside and inside of said otter board, said through-hole or through-holes being each covered by a flap protruding inside therefrom so as to form an opening directed forwards in the tugging direction for introducing water current therein.

According to the invention, since water flow inside of wing body is caused to flow out through the through-hole provided in the wing body, drag (D) is decreased; since the through-hole is covered by flap without decrease of inner side surface of the wing body, decrease of net-mouth expanding force (L) is prevented; and since the outside water flow is increased and accelerated by the volume of water flow from inside to outside through said through-hole, thus resulting in a lower pressure of water flow outside of wing body than that of wing body having no through-hole and flap, ratio (L/D) is substantially increased.

The otter board according to the invention having a simple construction can increase net-mouth expanding force (L) and decrease drag (D) with an increased efficiency (L/D). Accordingly, the otter board according to the invention allows for use of a larger trawl net, and the size Of Otter board itself can be decreased with easier handling thereof.

BRIEF DESCRIPTION OF THE ATTACHED DRAWINGS

In the drawings,

FIG. 1 is a perspective view of the first embodiment of the invention,

FIG. 2 (a), (b) and (c) are the cross sections of water currents flowing along the inner and outer surfaces of otter boards having no through-hole, having a through hole but no flap means and the otter board shown in FIG. 1 according to the invention, respectively, FIG. 3 is a perspective view of the second embodiment according to the invention, FIG. 4 is a cross sectional view taken along the line IV—IV in FIG. 3, FIG. 5 is a perspective view of one of the heretofore known otter boards, and FIG. 6 is the same view as FIG. 5 showing another known type of otter board.

DETAILED DESCRIPTION

An embodiment Of the invention Will be described hereunder with reference to FIG. 1-4.

Figure 1:
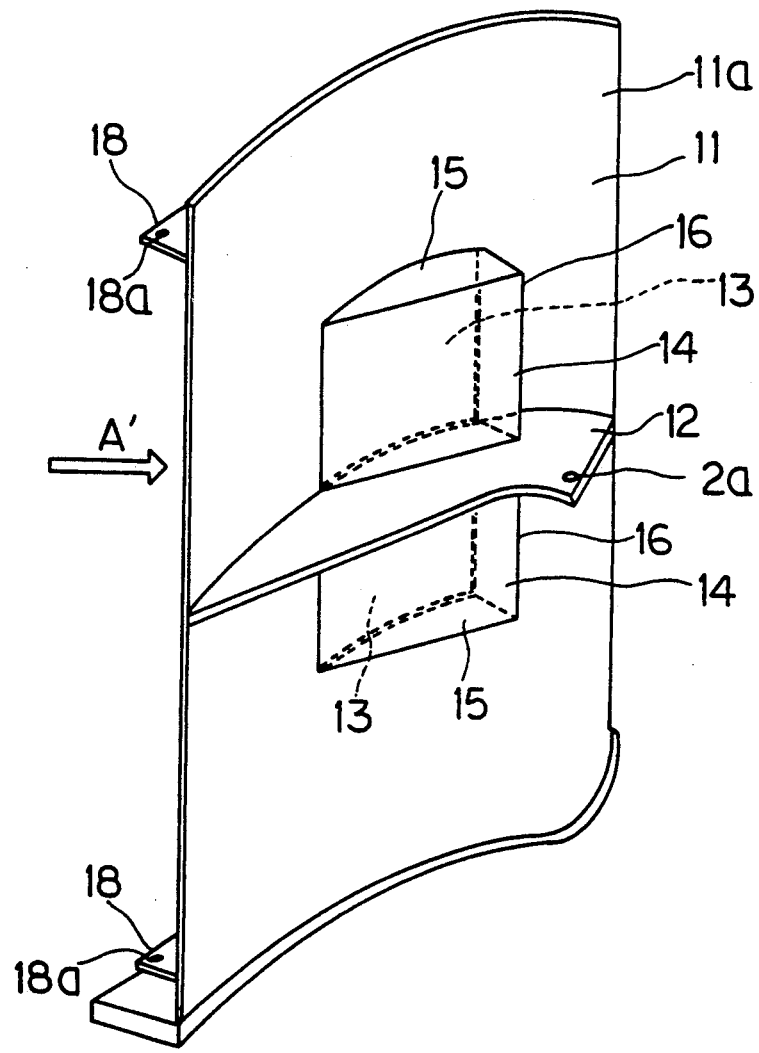

The Otter board body designated by 11 shown in FIG. 1 consists of a single plane which is tugged right hand in this drawing. Said otter board body 11 has an inner surface 11a which is concave with respect to the tugging direction. A central projecting bracket 12 is provided along the central lateral line Which divides the otter board body into upper and lower portions. Rectangular through-holes 13, 13 are bored in the central portion of said otter board body 11 so as to be located at respective upper and lower positions with respect to said central bracket 12. Otter flaps 14, 14 are provided so as to cover these through-holes 13, 13. The front end of each otter flap is spaced with a suitable distance from the otter board body 11, and the rear end thereof is attached to said otter board body 11. Further, the upper and lower edges of said Otter flaps 14 are attached to said otter board body 11 by means of fixing means 15, 15, respectively. It is noted from the above description that flap construction in this embodiment covers said through-holes 13 by means of said central bracket 12, otter flaps 14 and said flap fixing means 15 and shows openings 16, 16 directed forwards in the tugging direction for introducing water current therein. Under the consideration of viscosity of water and other factors, said otter flaps 14 and fixing means 15 may be formed from punching metal or meshed materials.

The otter board in this embodiment is tugged in the direction shown by A' (in the right hand in FIG. 1) by means of warp connected to the connecting hole 12a in the central bracket 12 through a towing chain, together with the trawl net connected to the connecting holes 18a, 18a in the end brackets 18, 18 fixed at the upper and lower portions of rear side surface Of said otter board body 11 respectively through otter pendant, hand rope and net pendant.

The operation of the otter board according to this embodiment is now described hereinbelow.

First, the function of said otter flaps 14 of otter board of this embodiment is described with reference to FIG. 2 (a), (b) and (c), which are schematic cross sectional views of usual otter board body, an otter board body having only a through-hole and the flaps of the otter board body according to this embodiments, respectively.

Figure 2A:
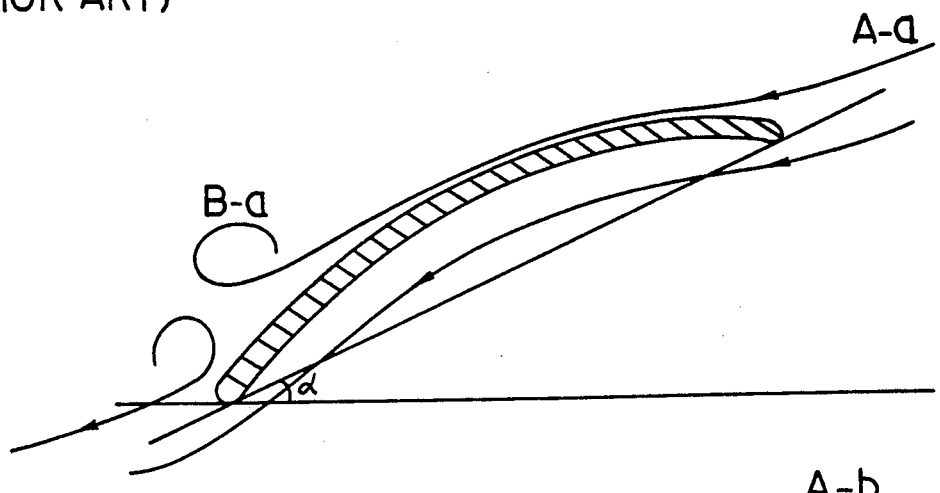
Figure 2B:
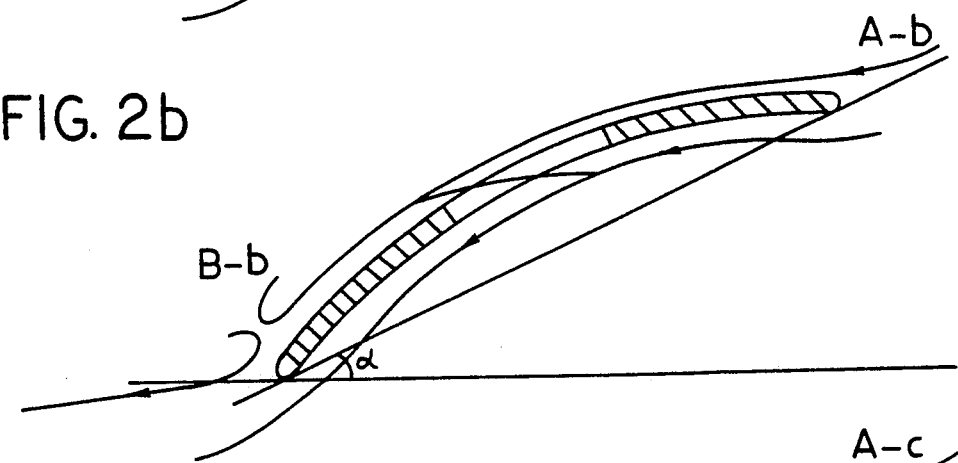
Figure 2C:
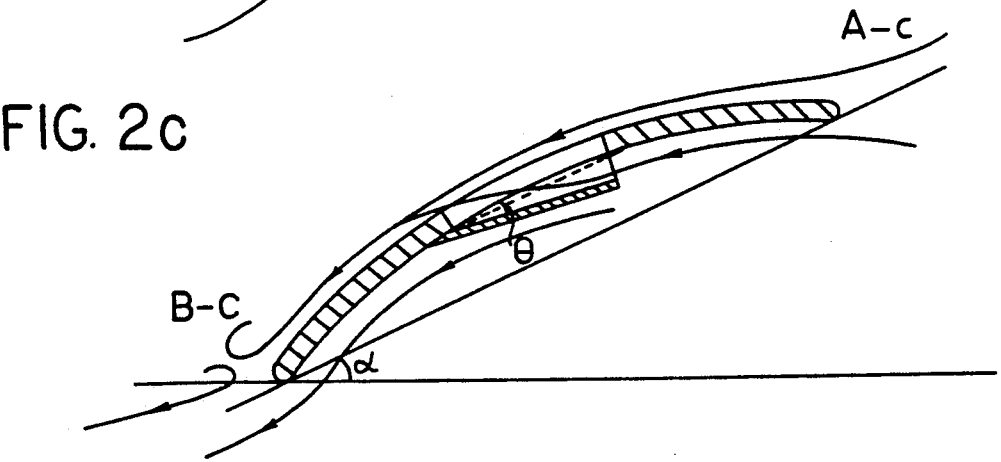

With reference to FIG. 2 (a), the water current around the usual otter board takes the form of streamline A-a, wherein a vortex B-a is observed from the approximate middleportion to the rear portion of the outside surface of said otter board body. This vortex does not contribute to net-mouth expanding force (L) but causes drag (D). For the purpose of decreasing this vortex and shifting the same as backwards as possible, an otter board as shown in FIG. 2 (b) can be considered. In this case, water current passes through a through-hole to flow along the outer surface of said otter board, causing a streamline as shown by A-b and a smaller vortex which is shifted rearward. Consequently, drag (D) becomes smaller, but the real surface area of otter board is decreased with the result of net-mouth expanding force (L) to be also decreased.

According to the embodiment of the invention shown in FIG. 2 (c). a streamline A-c is formed, and a smaller vortex B-c is formed more backwards. More specifically, the inside streamline flows into said opening, passes through the gap between said through-hole 13 and otter flap 14 and flows along the outer surface of otter board in the same manner as in FIG. (b). The vortex formed is smaller and is shifted backwards, so that drag (D) becomes smaller as in FIG. (b). On the other hand, since net-mouth expanding force (L) is caused also by said otter flaps, the decrease of net-mouth expanding force (L) as in FIG. 2 (b) is not caused. Thus, the otter board according to the invention is a very excellent otter board which can decrease drag (D) without decreasing net-mouth expanding force (L), thereby to largely improve the rate (L/D).

Further, the volume of water flow on the outer side surface of otter board becomes larger by that passing through said through-hole 13 from inner side to outer side of otter board and the outer water flow constitutes an accelerated laminar flow, so that the pressure of water flow outside of otter board body is decreased in comparison with an otter board having no through-hole 13 and otter flap. Therefore, net-mouth expanding force (L) and consequently rate (L/D) are further increased.

In an experiment, for the surface area of otter board body 11 as 100% and for the area of flaps 14 as 13%, the angle θ of said flaps was changed from 0° to 20° and the corresponding values of net-mouth expanding force (L) and drag (D) of the otter board were determined. For the values of (L) and (D) as 100% when θ is 0°, the percentages Of (L) and (D) were 107% and 80% respectively, so that (L) was increased by 7% and the (D) was decreased by 20%, resulting in the value of (L/D) increased by the function of 1.34.

Further, when the angle θ is larger than the angle of attack α, said flaps become rather a resistant plate with smaller (L) and larger (D).

Figure 3:
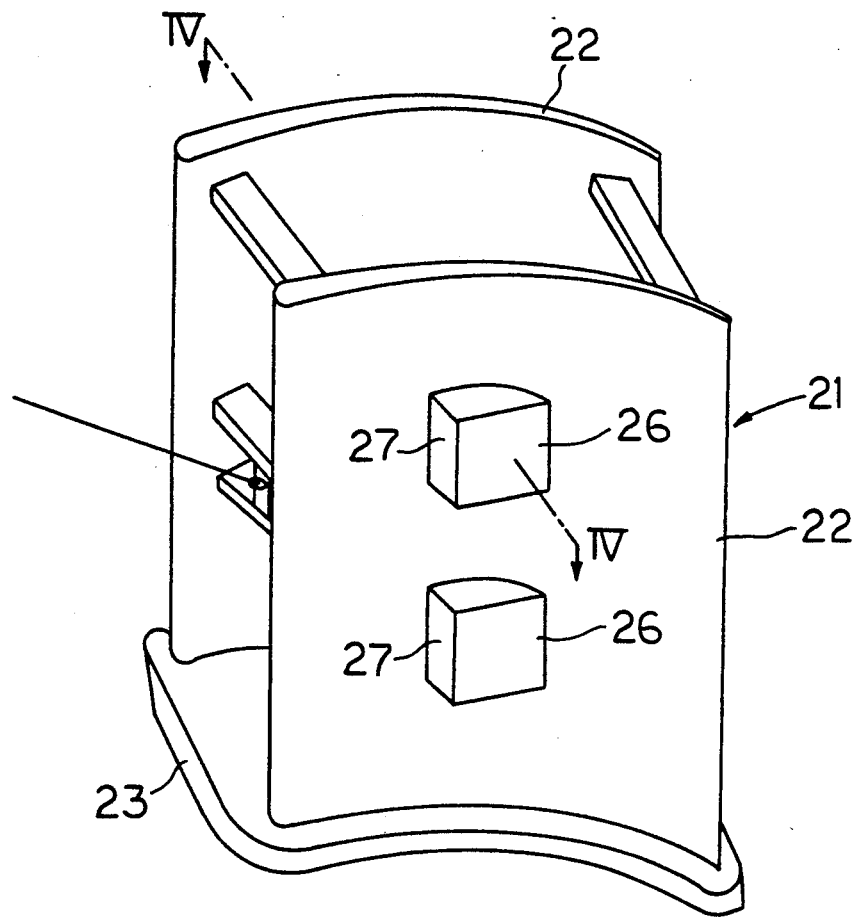
Figure 4:
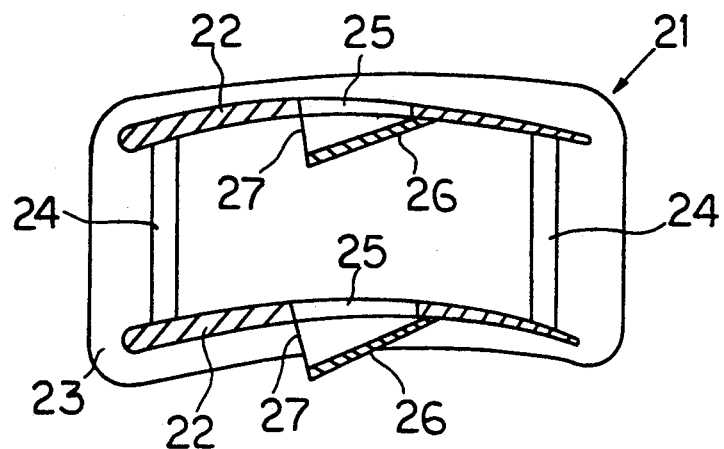
Figure 5:
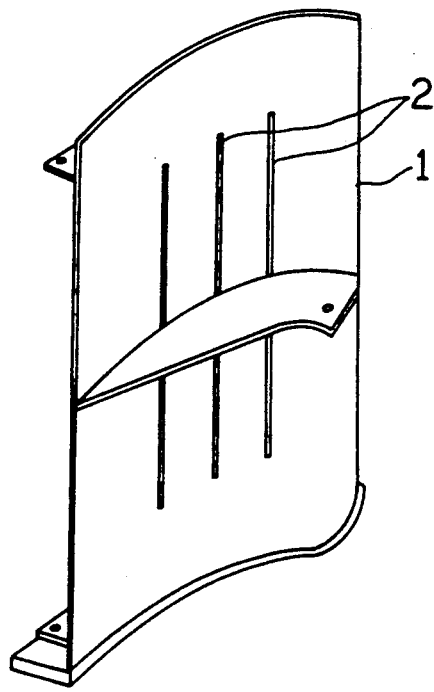
Figure 6:
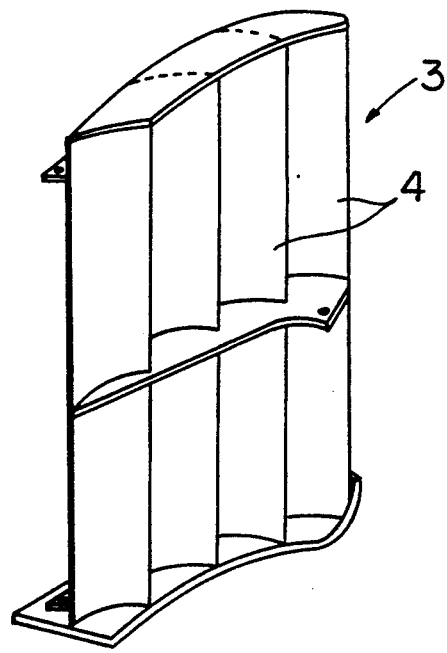

FIG. 3 and FIG. 4 show the second embodiment of the invention.

This second embodiment has a biplane construction comprising 2 wing bodies 22, 22 and a bottom sled 23. Said Wing bodies 22, 22 are connected in parallel relation with each other by means Of connecting rods 24, 24 fixed at the upper and lower portions of said construction. Each wing body 22 has a concave inner surface, and through-holes 25, 25 are provided in the upper and lower portions of said inner surface. Respective through-hole can be covered by flaps 26 which form respective openings 27 directed forwards in the tugging direction.

Owing to the combination of said through-hole 25 and said flaps 26, the efficiency of otter board is considerably increased with CL/CD ratio of 1.35 and more, wherein (CL) being lift coefficient and (CD) being drag coefficient, in comparison with the usual otter board without these members.

Further, said combination of through-hole 25 and flaps 26 can be used in any wing body or bodies 22 in accordance with the design conditions.

The invention is not limited to the above described examples, but can be varied in the scope thereof.

What is claimed is:

1. A rigid biplanar otter board towable through the sea for laterally diverting an object towed therefrom, comprising:
   a. a pair of spaced apart, parallel curved boards having generally smooth exteriors and apertures formed therein;
   b. stringers extending generally transversely between and fixedly connecting said curved boards, for maintaining said boards in spaced disposition respecting one another;
   c. flap means connected to said boards at downstream edges of said apertures and diverging from said boards with lateral position on said board to define a mouth facing upstream along said board surface;
   d. planar fixing means extending transversely between said board and said flap means at respective vertical extremities of said flap means, for defining a conduit for passage therethrough of water from said mouth to said aperture;

whereby water flows into said mouth, through said conduit and exits from said aperture to a convex surface of said board as said board is towed, shifting any vortex formed proximate the convex surface of said board towards the rear of said board.

2. The otter board of claim 1 wherein said flap means are planar.

3. The otter board of claim 2 wherein said flap means are rectangular.

4. The otter board of claim 1 wherein the flap means are on concave surfaces of respective boards, opening laterally outwardly respecting said concave surfaces.

5. The otter board of claim 4 wherein said boards have transverse cross-section of hydrofoil shape defined by outwardly facing lateral surfaces of differing curvature, a vertically extending leading edge being rounded; said cross section tapering to a feathered trailing edge as a result of said differing curvatures of said outwardly facing lateral surfaces.

6. The otter board of claim 1 wherein board leading vertically extending edges are rounded and thicker than feathered trailing vertically extending edges to define board cross-sections in the form of hydrofoils.

7. The otter board of claim 1 wherein vertically extending edges of said board are straight.

8. The otter board of claim 1 wherein leading vertically extending edges are rounded and thicker than feathered trailing vertically extending edges to define a board cross-section in the form of a hydrofoil.

9. The otter board of claim 1 wherein said boards have transverse cross-section of hydrofoil shape defined by outwardly facing lateral surfaces of differing curvature, a vertically extending leading edge being rounded; said cross section tapering to a feathered trailing edge as a result of said differing curvatures of said outwardly facing lateral surfaces.

10. The otter board of claim 1 wherein
   a. said boards are curved about vertical axes;
   b. said flap means are planar and rectangular;
   c. said planar fixing means are perpendicular to said boards and parallel to said stringers;
   d. said flap means are on concave surfaces of respective boards, opening laterally outwardly respecting said concave surfaces;
   e. vertically extending edges of said boards are straight;
      i. leading vertically extending edges being rounded and thicker than feathered trailing vertically extending edges to define board cross sections in the form of hydrofoils; and
   f. horizontally extending board edges curve in a horizontal plane.

11. The otter board of claim 1 wherein said boards have transverse cross-section of hydrofoil shape defined by outwardly facing lateral surfaces of differing curvature, a vertically extending leading edge being rounded; said cross section tapering to a feathered trailing edge as a result of said differing curvatures of said outwardly facing lateral surfaces.

12. A rigid otter board towable through the sea for laterally diverting an object towed therefrom, comprising:
   a. a curved board having a generally smooth exterior and at least one aperture formed therein;
   b. flap means connected to said board at downstream edges of said aperture and diverging from said board with lateral position on said board to define a mouth facing upstream along said board concave surface;
   c. planar fixing means extending transversely between said board and said flap means at respective vertical extremities of said flap means, for defining a conduit for passage therethrough of water from said mouth to said aperture;
whereby water flows into said mouth, through said conduit and exits from said aperture to a convex surface of said board as said board is towed, shifting any vortex formed proximate the convex surface of said board towards the rear of said board.

13. The otter board of claim 12 wherein said board is cured about a vertical axis.

14. The otter board of claim 12 wherein said flap means are planar and rectangular.

15. The otter board of claim 14 wherein said planar fixing means are perpendicular to said board.

16. The otter board of claim 15 wherein said board has a transverse cross-section of hydrofoil shape defined by outwardly facing lateral surfaces of differing curvature, a vertically extending leading edge being rounded; said cross-section tapering to a feathered trailing edge as a result of said differing curvatures of said outwardly facing lateral surfaces.

17. The otter board of claim 12 wherein said flap means are on a concave surface of said board, opening laterally outwardly respecting said concave surface.

18. The otter board of claim 12 further comprising:
   a. a planar horizontally elongated strut substantially bisecting said aperture and extending generally transversely from a concave surface of said curved board proximate the horizontal midpoint thereof; and wherein
      i. said board is curved about a vertical axis;
      ii. said flap means are planar and rectangular;
      iii. said planar fixing means are perpendicular to said board;
      iv. said flap means are on a concave surface of said board, opening laterally outwardly respecting said concave surface;
      v. vertically extending edges of said board are straight;
         (1) leading vertically extending edges being rounded and thicker than feathered trailing vertically extending edges to define a board cross-section in the form of a hydrofoil; and
      vi. horizontally extending board edges curve in a horizontal plane.

19. The otter board of claim 12 wherein said board has a transverse cross-section of hydrofoil shape defined by outwardly facing lateral surfaces of differing curvature, a vertically extending leading edge being rounded; said cross section tapering to a feathered trailing edge as a result of said differing curvatures of said outwardly facing lateral surfaces.

20. A rigid otter board towable through the sea for laterally diverting an object towed therefrom, comprising:
   a. a curved board having a generally smooth exterior and at least one aperture formed therein with a transverse cross-section of hydrofoil shape defined by outwardly facing concave and convex lateral surfaces of differing curvature, a vertically extending leading edge being rounded, said cross-section tapering to a feathered trailing edge as a result of said differing curvatures of said outwardly facing lateral surfaces;
   b. flap means connected to said board at downstream edges of said aperture, diverging from said board with lateral position on said board to define a mouth facing upstream along said board concave surface; and
   c. means extending transversely between said board and said flap means at respective vertical extremities of said flap means, for defining a conduit for passage therethrough of water from said mouth to said aperture;
whereby water flows into said mouth, through said conduit and exits from said aperture in said convex surface of said board as said board is towed, shifting any vortex formed proximate the convex surface of said board towards the rear of said board.

* * * * *